UNITED STATES PATENT OFFICE 2,350,161

SOLUTION OF WATER-SOLUBLE CELLULOSE ETHER

Walter E. Gloor, New Brunswick, N. J., assignor to Hercules Powder Company, Wilmington, Del., a corporation of Delaware No Drawing. Application June 30, 1942, Serial No. 449,159

9 Claims. (Cl. 106—81)

This invention relates to aqueous coating compositions and more particularly to aqueous coating compositions containing a water-soluble cellulose ether as an essential film-forming ingredient. It also relates to materials such as paper and fiber board coated or impregnated with the dried composition.

Water-soluble cellulose ethers are useful in providing coatings which are flexible and highly resistant to oils and greases. However, coatings of such cellulose ethers have suffered from extremely poor adhesion to the base upon which they are deposited. In addition, the coatings have been insufficiently hard in some cases or have failed to impart a desired degree of stiffness when used in impregnation.

Now in accordance with this invention, these disadvantages are overcome by aqueous coating compositions containing a water-soluble cellulose ether in a proportion sufficient to render the composition capable of drying to form a self-supporting film, and an alkali metal silicate in an amount compatible with the cellulose ether. Sufficient of the alkali metal silicate is used to improve the adhesion of the cellulose ether but an insufficient amount is used to render the film inflexible.

The coating compositions in accordance with this invention are useful in coating rigid objects such as stone and concrete with excellent adhesion of the coating, and they are also highly useful in coating flexible materials such as paper, cardboard, fiber board and the like to impart a highly adherent grease-proof coating.

The compositions according to this invention are illustrated by the examples given in Table I. The compositions described in Table I were prepared by merely mixing the indicated quantities of a 2% solution in water of medium viscosity water-soluble methyl cellulose and a 40% solution in water of sodium silicate (water glass). Films of these compositions were cast on mercury and on glass. In all cases, good adhesion of the film to the glass surface was obtained. In comparison, a film of the methyl cellulose without the sodium silicate was stripped from glass almost without effort. It is known that methyl cellulose films will frequently come free from surfaces such as glass merely upon standing for a few days. The films cast on the mercury surface were all readily capable of self-support. All exhibited flexibility decreasing as the quantity of sodium silicate in the film increased.

Additional examples of cellulose ether-alkali metal silicate coating compositions are given in Table II. These compositions were prepared by stirring the cellulose ether into water at 90° C., cooling to 2° C., stirring further until a uniform dispersion was obtained, and adding the necessary quantity of other ingredients to make up the compositions indicated. The examples of Table II were all found to be useful for coating cardboard and fiber board to render them greaseproof. The composition of Example 12 was coated upon the porous fiber board stock to permit impregnation. The result was a highly stiffened, grease-proof board. The compositions in Examples 7, 8, and 9 were coated upon thin paper stock for grease-proofing and were found to deposit films sufficiently flexible for paper coating.

Table I

| Example | Methyl cellulose 2% solution in water | Sodium silicate 40% solution in water | Ratio of sodium silicate to methyl cellulose | Film properties |
|---|---|---|---|---|
| | Parts by weight | Parts by weight | | |
| 1 | 200 | 5 | 1:2 | Improved adhesion, film very flexible. |
| 2 | 200 | 10 | 1:1 | Optimum adhesion, combined with flexibility. |
| 3 | 200 | 15 | 1.5:1 | |
| 4 | 200 | 20 | 2:1 | |
| 5 | 200 | 25 | 2.5:1 | Good adhesion, film less flexible. |
| 6 | 200 | 30 | 3:1 | Good adhesion, film somewhat brittle. |

Table II

| | Example | | | | | |
|---|---|---|---|---|---|---|
| | 7 | 8 | 9 | 10 | 11 | 12 |
| Methyl cellulose (low viscosity) | 5 | | | 7 | 6 | 2 |
| Sodium glycollate cellulose ether (low viscosity) | | 4 | | | | |
| Ethyl cellulose (low viscosity) | | | 3 | | | |
| Sodium silicate | 5 | 5 | 1.5 | 20 | 18 | 6 |
| Glycerol | 1 | | 0.5 | | 1 | |
| Ethylene glycol | | 1 | | | | |
| Water | 88 | 90 | 80 | 73 | 75 | 92 |
| Ethyl alcohol | | | 15 | | | |

Alkali metal silicates generally, i. e., silicates of lithium, sodium or potassium, have been found suitable for the purpose illustrated by sodium silicate in the examples. Any of the various silicates are suitable but preferably silicates of relatively high complexity are utilized. Ordinarily, water glass serves the purposes of the invention well.

As shown by the examples of Table I, the alkali metal silicate may be used in a proportion to the water-soluble cellulose ether between about 2 parts and about 30 parts for each 10 parts of cellulose ether. Preferably, between about 10 parts and about 20 parts of alkali metal silicate for each 10 parts of cellulose ether will be utilized. In general, sufficient alkali metal silicate will be used to improve the adhesion of the cellulose ether film but the amount will be less than that causing the film to be too brittle for the intended use. It is to be noted that a quantity of silicate more than about 3 times the weight of the cellulose ether gives brittle films of little value since cellulose ethers are incompatible with the alkali metal silicates when small proportions of the ethers are added to the silicates.

Any of the water-soluble cellulose ethers capable of giving a flexible film are suitable in the compositions of the present invention. The degree of substitution of the cellulose will be within the range insuring solubility in essentially aqueous media. Methyl cellulose is particularly suitable and readily available. However, water-soluble ethyl cellulose, water-soluble celluose ethers of glycollic acid or salts of glycollic acid, water-soluble hydroxyethyl cellulose and the like have been found suitable. In most cases, the cellulose ethers will be insoluble or only partly soluble in hot water but will be soluble in cold water and at room temperatures.

The aqueous coating compositions will usually contain between about 0.3% and about 20% by weight of the solution of the water-soluble cellulose ethers. Preferably, concentrations of the cellulose ether lie between about 2% and about 10% of the composition. Where impregnation of porous surfaces is desired, relatively low concentrations will be utilized to maintain the viscosity of the composition as low as possible. For coatings upon porous surfaces with minimum impregnation, relatively high concentrations are preferably used. High concentrations are also preferable where the coating compositions are used as adhesives.

The compositions may contain plasticizers such as ethylene glycol, diethylene glycol, glycerol, diacetin, glycerol borate condensates, and the like. They may also contain water-soluble film builders or gums such as dextrose, gum tragacanth, water-soluble casein, and the like. Pigments or coloring matter may also be incorporated.

The aqueous coating compositions are particularly useful in coating fibrous stock since the degree of impregnation can be readily controlled by control of the viscosity of the coating composition. For impregnation of cardboard and the like, they impart hardness and rigidity with some resilience. The resulting products are grease-proof. The coating compositions deposit a highly adherent film and are useful as adhesives as well as to provide a grease-proof finish. The compositions are not readily discolored upon contact with iron surfaces and thus, are capable of drying to coatings free of stains and rust spots.

What I claim and desire to protect by Letters Patent is:

1. An aqueous coating composition comprising a water solution of a water-soluble cellulose ether in a quantity between about 0.3% and about 20% by weight of the composition and in a proportion sufficient to render the composition capable of drying to form a self-supporting film, and an alkali metal silicate in an amount between about 2 and about 30 parts by weight for each 10 parts of the cellulose ether.

2. An aqueous coating composition comprising a water solution of a water-soluble methyl cellulose in a quantity between about 0.3% and about 20% by weight of the composition and in a proportion sufficient to render the composition capable of drying to form a self-supporting film, and a sodium silicate in an amount between about 2 and about 30 parts by weight for each 10 parts of the cellulose ether.

3. An aqueous coating composition comprising a water solution of a water-soluble methyl cellulose in a quantity between about 2% and about 10% by weight of the composition and in a proportion sufficient to render the composition capable of drying to form a self-supporting film, and a sodium silicate in an amount between about 10 and about 20 parts by weight for each 10 parts of the cellulose ether.

4. An aqueous coating composition comprising a water solution of a water-soluble ethyl cellulose in a quantity between about 2% and about 10% by weight of the composition and in a proportion sufficient to render the composition capable of drying to form a self-supporting film, and a sodium silicate in an amount between about 2 and about 30 parts by weight for each 10 parts of the ethyl cellulose.

5. An aqueous coating composition comprising a water solution of a water-soluble cellulose glycollic ether in a quantity between about 2% and about 10% by weight of the composition and in a proportion sufficient to render the composition capable of drying to form a self-supporting film, and an alkali metal silicate in an amount between about 2 and about 30 parts by weight for each 10 parts of cellulose glycollic ether.

6. Fibrous sheeted material coated with a composition comprising a water-soluble cellulose ether and an alkali metal silicate in a quantity between about 2 and about 30 parts by weight for each 10 parts of the water-soluble cellulose ether.

7. Paper coated with a composition comprising a water-soluble methyl cellulose and sodium silicate in a quantity between about 10 parts and about 20 parts for each 10 parts of the methyl cellulose.

8. Fibrous sheeted material coated with a composition comprising a water-soluble ethyl cellulose and an alkali metal silicate in a quantity between about 2 and about 30 parts by weight for each 10 parts of the water-soluble cellulose ether.

9. Fibrous sheeted material coated with a compoistion comprising a water-soluble cellulose glycollic ether and an alkali metal silicate in a quantity between about 2 and about 30 parts by weight for each 10 parts of the water-soluble cellulose ether.

WALTER E. GLOOR.